United States Patent [19]
Repin et al.

[11] Patent Number: 4,582,599
[45] Date of Patent: Apr. 15, 1986

[54] AERATION TANK

[76] Inventors: Boris N. Repin, Stremyanny pereulok, 17/21, kv. 58; Margarita V. Koroleva, Zoologicheskaya ulitsa, 30, kv. 53; Vladimir I. Chernikov, Leningradsky prospekt, 71, kv. 19; Marx I. Drukarov, ulitsa Vucheticha, 8, kv. 39; Vera L. Jusova, M.Karamyshevskaya naberezhnaya, 23, kv. 10, all of Moscow, U.S.S.R.

[21] Appl. No.: 696,451
[22] Filed: Jan. 31, 1985
[51] Int. Cl.⁴ .............................................. C02F 3/16
[52] U.S. Cl. .................. 210/110; 210/195.1; 210/202; 210/205
[58] Field of Search ...................... 210/625, 628, 195.1, 210/201, 202, 219, 220, 205, 206, 110, 112, 114, 121, 124

[56] References Cited
U.S. PATENT DOCUMENTS 3,438,499  4/1969  Reckers .................... 210/195.1 X
3,709,792  1/1973  Hampton .................... 210/625 X
3,872,003  3/1975  Walker .................... 210/195.1 X
3,926,794  12/1975  Vahldieck .................... 210/625 X

FOREIGN PATENT DOCUMENTS 2936884  3/1981  Fed. Rep. of Germany .
3011247  11/1981  Fed. Rep. of Germany .
2456712  12/1980  France .
2516071  5/1983  France .
958326  9/1982  U.S.S.R. .
969681  10/1982  U.S.S.R. .
1011556  4/1983  U.S.S.R. .
1017688  5/1983  U.S.S.R. .
1036689  8/1983  U.S.S.R. .

Primary Examiner—Thomas Wyse
Attorney, Agent, or Firm—Burgess, Ryan & Wayne

[57] ABSTRACT

An aeration tank for purifying sewage water by activated sludge comprising a mixing vessel communicated, according to the principle of communicating vessels, with a sludge separator, and a regenerator of activated sludge communicable with an outlet or recyclable sludge of the sludge separator and with the mixing vessel for feeding thereinto regenerated activated sludge. The mixing vessel is provided with at least one vertically arranged blade-type aerator having a suction tube an inlet end of which communicates with the regenerator, whereas an outlet end of which has a funnel accommodating the blades of the aerator. The sludge separator is equipped with a regulator of dynamic level of sludge medium, the upper edge of the funnel being positioned substantially above the dynamic level of the sludge medium in the mixing vessel.

3 Claims, 5 Drawing Figures

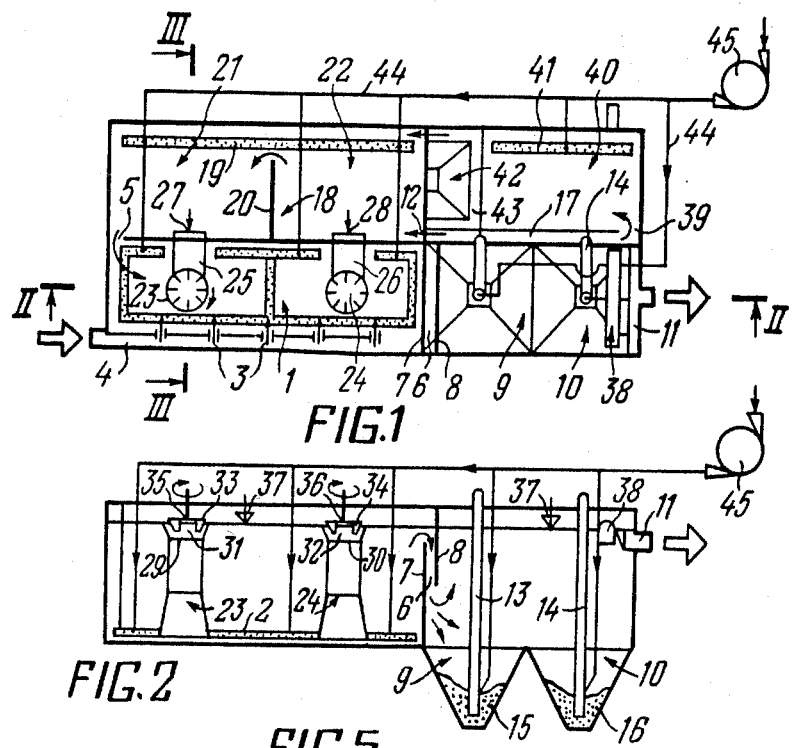
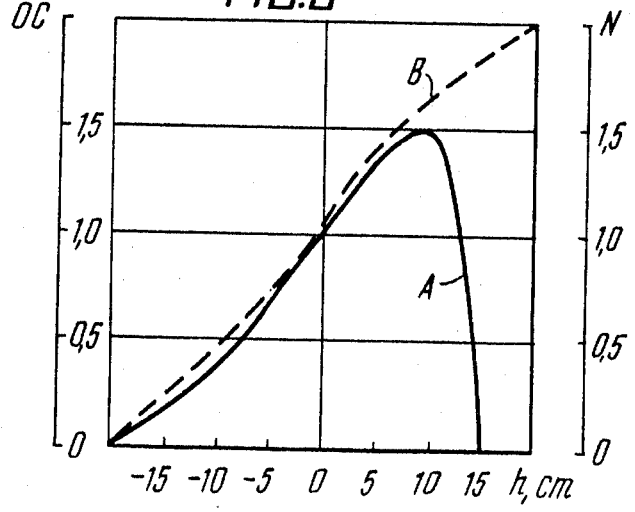

AERATION TANK

This invention relates to aerations tanks for biological purification of waste water by activated sludge.

The invention can find application for complete biotreatment of municipals sewage water at practically any possible rate of its delivery to the sewage treating facilities.

The invention can also be used for partial or complete biological purification of industrial waste water containing biodecomposable organic contaminants in various concentrations.

The invention can be employed most effectively during complete biological purification of relatively small amounts of concentrated municipal and industrial process water supplied for purification at fluctuating rates depending on the time of day.

Aeration tanks are the largest and most power-consuming units in the modern aeration plants. In the aeration tanks—vessels commonly constructed from reinforced concrete—incoming waste water is mixed with activated sludge and subjected to continuous aeration as it travels from the initial treatment zone to the final one. As a result, aerobic micoorganisms populating the activated sludge act to bio-decompose organic pollutants thereby clarifying the waste water. Subsequent to this, the waste water is separated from the activated sludge which is recycled to the initial treatment zone of the aeration tank, and the purification cycle is repeated.

The efficiency of the purification process in aeration tanks, both from the point of view of clarity of the water treated and providing stable characteristics, is dependent on a number of conditions and factors among which are: composition and properties of waste water, rate of waste water delivery to the aeration tank, concentration of activated sludge in the aeration tank and its functional activity, oxygenation rate, and hydrodynamic conditions in the aeration tank providing for continuity of the critical process parameters in various zones of the body of liquid inside the tank. As usual, the flow rate of waste water delivered for aeration is erratic. Practice has shown that optimized relationship between the concentration of activated sludge, organic contaminants and dissolved oxygen is rarely maintained, hence the degree to which the waste water under treatment is purified lacks uniformity and costs associated with the purification process are relatively high.

There is known a device for biological purification of waste water by activated sludge comprising two substantially annular aeration tanks connected in parallel and provided with a rotatable truss on which aerating means (viz., air dispersers) are secured, two radial-type aerated recirculation vessel also connected in parallel, and a sludge separator. In this device the recyclable sludge evacuated from the sludge separator is distributed between the aerated recirculation vessels and aeration tanks (cf., West German Application No. DE 2,936,884; IPC C 02 F 3/12; filed Sept. 12, 1979). Three groups of air blowers of various capacity assure the required supply of air both at high and low delivery rates of waste water and organic contaminants.

The amount of air supplied for aeration of the sludge medium is controlled by engaging and disengaging various number of air blowers, which entails nonuniform operation of the air dispersers and reduces the degree of utilization of air oxygen and promotes plugging of the dispersers when most of them are out of operation.

Although this device makes use of regenerated activated sludge, its concentration remains practically invariable, which fails to assure a continuity in the proportions between the concentration of activated sludge and incoming sewage at fluctuations in the flow rate of the incoming waste water.

The accommodation of the aerators on the rotating trusses poses certain difficulties both structurally and in the course of operation. In addition, the provision of the three groups of air blowers of different capacity causes additional disadvantages due to the impossibility to interchange various parts and units of the air blowers.

There is also known an aeration tank comprising a vessel separated by longitudinal partitions into communicating passages, and a system of dispersion aeration having arranged substantially in line with the longitudinal axis of each of the passages substantially hollow posts provided in their upper portion with mechanically-operated aerators and horizontal tubes secured tangentially to the lower part of the posts to communicate them with the adjacent passages (cf., e.g., USSR Inventor's Certificate No. 1,017,688 A, published Jan. 22, 1982; IPC E 02 E 02 F 3/12).

The aeration tank of the above construction makes it possible to vary the hydrodynamic structure of the sludge medium flow from the operating conditions providing for displacement of the sludge medium to mixing, as well as to control the consumption of electric power required for aeration through a stepwise engagement of the mechanically-operated aerators.

However, making use of the activated sludge which failed to pass through regeneration results in insufficient utilization of the oxidation power of microorganisms, which calls for an increase in the overall dimensions of the aeration tank and, consequently, for an increase in the amount of electric power consumed for aeration.

In addition, the concentration of activated sludge in the sludge medium of the aeration tank is practically invariable, which results in that an increase in the amount of oxygen supplied by the stepwise engagement of the mechanical aerators is not utilized effectively; this increase in the amount of oxygen also failing to provide for optimized relationship between the concentration of activated sludge and the concentration of organic contaminants under fluctuating rates of delivery of the sewage water, which in the end affects the quality of purification process.

There is known an aeration tank for purifying waste water by activated sludge comprising a mixing vessel provided with dispersers of oxygen-containing gas having inlets of waste water and regenerated activated sludge and an outlet of the sludge medium communicated, according to the principle of communicating vessels, with the sludge separator serving for separating purified water and recyclable sludge from the sludge medium and having an outlet of the purified water and an outlet of the recyclable sludge communicated with the regenerator of the activated sludge provided with dispersers of oxygen-containing gas and having an outlet connected to the mixing vessel for feeding regenerated activated sludge thereinto (cf., e.g., USSR Inventor's Certificate No. 1,036,689 A, published Apr. 29, 1982; IPC E 02 F 3/12).

An aeration tank of the aforedescribed construction ensures utilization of preliminarily regenerated activated sludge, stepwise variation in the hydrodynamic structure of the flow of sludge medium, and concentration of the activated sludge. However, fine-bubble dispersers of intermittent action are susceptible to fast plugging and failure, whereas the use of large-bubble dispersers of intermittent action, while reducing the susceptibility to plugging, results in a rather low degree of oxygenation by the oxygen-containing air introduced periodically by air blowers.

Another disadvantage is that the above aeration tank provides for only two varieties of the concentration of the activated sludge, viz. maximum and minimum concentrations, which is insufficient for ensuring optimized conditions to carry out the purification process taking into account the actual fluctuations in the amount of contaminants delivered for purification by waste water. Attempts to obviate such a disadvantage in the aeration tank of the aforedescribed construction would result in structural overcomplications and increased difficulties in operation.

It is therefore an object of the present invention to obviate the disadvantages of the prior art aeration tanks, particularly to provide for complete and stable biotreatment of waste water when the incoming flow of waste water and concentration of organic pollutants fluctuate considerably.

Another object is to substantially reduce the working volume of aeration tanks while maintaining a high degree of waste water purification.

One more object is to substantially reduce unproductive expenditures of electric power required for aeration in the course of waste water purification.

The objects and other attending advantages of the invention are attained by that in an aeration tank for purifying waste water by activated sludge comprising a mixing vessel with dispersers of oxygen-containing gas having inlets of waste water and regenerated activated sludge, and an outlet of a sludge medium communicated, according to the principle of communicating vessels, with a sludge separator serving to separate purified water and recyclable sludge from the sludge medium and having an outlet of purified water and an outlet for discharging recyclable sludge communicable with a regenerator of the activated sludge, provided with dispersers of oxygen-containing gas and having the outlet connected to the mixing vessel to feed the regenerated activated sludge thereto, according to the invention, the mixing vessel is equipped with at least one vertical mechanically-operated blade-type aerator having a suction tube an inlet end of which communicates with the regenerator, whereas an outlet end thereof has a funnel accommodating blades of the aerator, an upper edge of the funnel being positioned substantially above the dynamic level of the sludge medium in the mixing vessel, the outlet of the purified water of the sludge separator being provided with a regulator of the dynamic level of the sludge medium adapted to control the dynamic level of the sludge medium in dependence on the influx of waste water.

The provision in the mixing vessel having dispersers of oxygen-containing gas, such as air, of at least one vertical mechanically-operated blade-type aerator makes it possible to carry out aeration of the sludge medium in two levels without subjecting fine-bubble dispersers to plugging.

The first level involves a basic or continuously operating aeration carried out by continuous delivery of compressed air to the fine-bubble dispersers. Therewith, the amount of oxygen-containing gas fed to the disperser is minimal, sufficient for keeping the activated sludge in a suspended state and maintaining its aerobic activity when the influx of waste water is reduced. This in turn prevents overconsumption of electric power during low process loads, provides favourable conditions for efficient oxygenation, since bubbling of the oxygen-containing gas is optimized, and drastically extends the service life of the fine-bubble dispersers due to a quite substantial reduction in the gas load per unit of their surface area.

The second level involves controllable or intermittent aeration, which is effected by introduction to the sludge medium of added quantity of oxygen as a result of stepwise actuation of the vertical mechanical aerators during an increase in the influx of waste water supplied for treatment. Therefore, the greater is the number of mechanically-operated vertical aerators, the more accurately oxygenation conditions correspond to the consumption of oxygen by the sludge medium, which in turn facilitates interchangeability of the aerators. However, excessive number of the mechanically-operated vertical aerators may complicate their operation. In view of the foregoing, the optimum number of such aerators is precalculated according to the specific operating conditions of the aeration tank.

Desirably, the regulator of the dynamic level of the sludge medium is fashioned as an overflow trough communicating by at least two flexible pipes secured on either end thereof, inlet of these flexible pipes being connected to a box-like intake of purified water provided with flow guide partitions and a floating element ensuring a continuous immersion depth of the inlet ends of the flexible pipes relative to the dynamic level of the sludge medium.

Such a construction of the dynamic level regulator makes it possible to vary in a simple and efficient manner the level of sludge medium in the sludge separator and mixing vessel connected thereto according to the principle of communicating vessels, the flexible pipes serving not only for discharging the purified water outside the apparatus, but also functioning as soft confining members fixing the position of the dynamic level regulator in plan. The provision of the flow guide partitions in the box-like intake of the purified water ensures uniform removal of water from the surface layers of the sludge separator thereby preventing their excessive agitation and reducing the amount of suspended particles of the activated sludge carried by the purified water.

Preferably, the free passage area of the flexible pipes and the depth of continuous immersion of their inlet ends relative to the dynamic level of the sludge medium is selected such that the depth of immersion of the aerator blades relative to the dynamic level of the sludge medium would vary substantially within a range of from 0.05 to 0.15 m.

The aforedescribed provision enables one to smoothly control the amount of sludge medium pumped by the mechanically-operated vertical aerator and therefore its oxygenation capacity depending on the fluctuations in the flow rate of waste water delivered for treatment. Such an arrangement makes it possible to more economically utilize the electric power consumed by the mechanically-operated aerators during biotreatment of waste water by activated sludge.

The invention will now be described in greater detail with reference to various specific embodiments thereof taken in conjunction with the accompanying drawings, in which:

FIG. 1 is a plan sectional view of an aeration tank according to the invention;

FIG. 2 is a side elevation of the aeration tank according to the invention;

Figure 4:
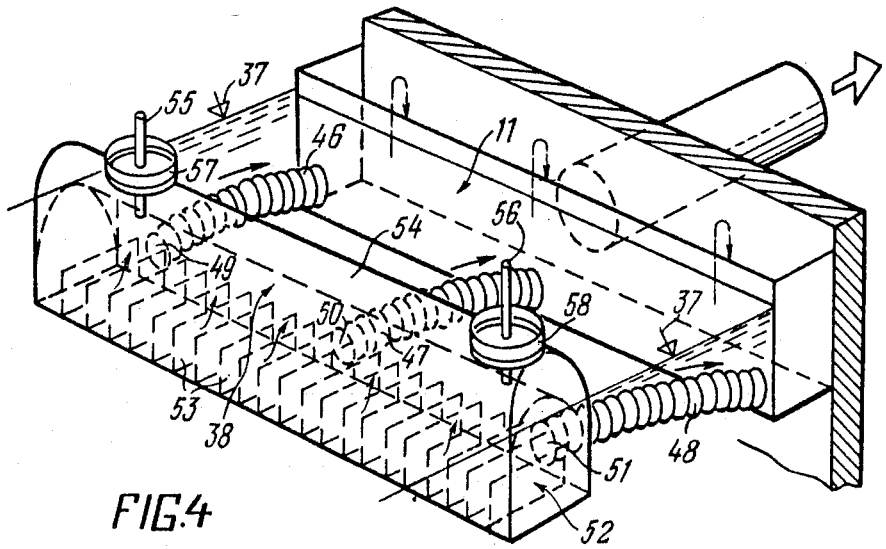

FIG. 4 is a general view of a regulator of the dynamic level of the sludge medium; and FIG. 5 illustrates a dependence of the oxidation power (OP) (curve A) and the electric power (N) (Curve B) consumed, expressed in dimensionless units, on the depth (h, cm) of immersion of the blades of the mechanically-operated vertical aerator; taken as a unit being the value of OP and N at zero immersion depth of the aerator blades.

With reference to FIG. 1, an aeration tank according to the invention comprises a mixing vessel 1 provided with dispersers 2 of oxygen-containing gas and having inlets 3 of sewage water supplied from a distribution chute 4, an inlet 5 of regenerated activated sludge, and an outlet 6 of sludge medium, this sludge medium being discharged by means of a launder 7 and a weir 8, the outlet 6 being communicated according to the principle of communicating vessels with sludge separators 9 and 10 adapted for separating from the sludge medium of the purified water and recyclable sludge. The sludge separators 9 and 10 have an outlet 11 of purified water (overflow trough) and a passage 12 for discharging the recyclable sludge which is done by airlifts 13, 14 arranged in substantially tapered bottoms 15, 16 (FIG. 2) of the sludge separators 9, 10, respectively, and connected to a sludge feeding trough 17. The passage or outer 12 (FIG. 1) for discharging the recyclable sludge communicates with an activated sludge regenerator 18 provided with dispersers 19 of oxygen-containing gas and a baffle 20 separating the regenerator 18 into two adjacent sections 21 and 22.

The regenerator 18 has an outlet 5 connected to the mixing vessel 1 for feeding regenerated activated sludge thereinto.

The mixing vessel 1 is provided with upright mechanical blade-type aerators 23, 24 having adjustable suction tubes 25, 26, inlet ends 27, 28 of which communicate with the regenerator 18, whereas outlet ends 29, 30 of which have funnels 31, 32 accommodating blades 33, 34 of the aerators 23, 24, respectively. Upper edges 35, 36 of the funnels 31, 32 are arranged at least not below dynamic level 37 of the sludge medium in the mixing vessel 1, the outlet 11 of the purified water of the sludge separators 9, 10 being provided with a regulator 38 of the dynamic level of the sludge medium adapted to control the dynamic level in direct proportion to the influx of the waste water to be treated.

Apart from the aforedescribed, the sludge feeding trough 17 has an adjustable outlet passage 39 for discharging excess sludge in size less than the passage or outlet 12 for discharging the recyclable sludge communicating with the sludge regenerator 18, the outlet 39 being in turn communicated with an aerobic mineralizer 40 intended to treat the excess activated sludge. A sludge compactor 42 is secured in the end part of the aerobic mineralizer 40 equipped with dispersers 41 of oxygen-containing gas, this sludge compactor 42 serving to compact the treated excessive activated sludge and having a collecting chute 43 of sludge water communicating with the regenerator 18. The dispersers 9, 19, 41 of the oxygen-containing gas, as well as the airlifts 13, 14 are connected by means of air ducts 44 to air blowers 45 of a basic or continuously operating aeration system.

Periodic or intermittent mode of operation corresponds to the structural peculiarities of mechanical aerators having an oxidizing capacity which is as high as the capacity of high-dispersion pneumatically-operated aerators, and are not subjected to plugging during between-operation periods. In addition, mechanical aerators employed in the aeration tanks of the proposed construction are by far more reliable and their service life is increased several-fold thanks to maintenance conveniencies available during between-operation periods, as well as due to that the electric motors driving the mechanical aerators serve much longer thanks to discontinuations in their operation.

Therefore, while the conventional air-dispersion aeration system is engaged round the clock, the frequency of engagement of the controllable mechanical aeration system is never more than 2 times a day. Further, when the aeration tank is provided with two vertical mechanically-operated aerators, one of such aerators operates about 8 to 10 hours and the other —4 to 6 hours within every 24 hours. It is therefore stands to reason that in the herein proposed aeration tank equipped with high-dispersion continuous action dispersers a complete failure of one of the vertical mechanically-operated aerators does not hamper the process, since it can be replaced during a 12–20 hrs between-operation idling period.

The provision in the mixing vessel of the aeration tank of the suction tube having an inlet end thereof communicated with the regenerator and an outlet end provided with a funnel accommodating the blades of the mechanically-operated vertical aerator makes it possible during operation of the mixing vessel to take from the regenerator a concentrated sludge medium and mix it with the sludge medium of the mixing vessel. As a result of mixing of the sludge medium of the mixing vessel having an activated sludge concentration 1–2 g/l with the flow of regenerated sludge concentrated to about 7–8 g/l during an increase in the process load, the concentration of activated sludge in the mixing vessel increases, for example, up to 4–5 g/l, which enables to maintain an optimized ratio between the concentration of activated sludge and organic impurities even when the process loads increase 2.5–3 times. If two mechanically-operated vertical aerators are provided, with suction tubes thereof connected to two adjacent sections of the regenerator separated by a baffle partition, it becomes possible to maintain in the mixing vessel of the aeration tank the concentration of the activated sludge not only at a minimum (1–2 g/l) and maximum (4–5 g/l) levels, but also at an intermediate (2.5–3 g/l) level. This gives the system for controlling the concentration of activated sludge a required flexibility and enables to minimize non-productive power expenditures for aeration of the sludge medium.

The upper edge of the funnel accommodating the blades of the mechanically-operated vertical aerator is disposed not below the dynamic level of the sludge medium in the mixing vessel during an increased influx of the waste water to prevent spontaneous overflow of the sludge medium from the mixing vessel to the regenerator. It must be taken in consideration, however, that positioning of the funnel edge too high above the dynamic level of the sludge mixture is undesirable, because it lowers the efficiency of the mechanically-operated vertical aerator.

The regulator of the dynamic level of sludge medium provided in the sludge separator makes it possible to adjust the dynamic level of liquid in the mixing vessel in direct dependence on the influx of sewage water, the mixing vessel being communicated according to the principle of communicating vessels with the sludge separator. This in turn ensures a gradual and automatic immersion of the blades of the aerator to or withdrawal from the water in such a manner that with a greater influx of the sewage water a greater amount of oxygen is introduced to the sludge medium.

In the proposed aeration tank the regulator 38 of the dynamic level of sludge medium is fashioned as an overflow trough 11 communicating by way of at least two flexible pipes 46, 47, 48 inlet ends 49, 50, 51 of which are connected to a box-like intake 52 of purified water provided with a flow guide partitions 53 and a floating element 54 which acts to ensure continuous immersion of the inlet ends 49, 50, 51 of the flexible pipes 46, 47, 48 relative to the dynamic level 37 of the sludge medium.

The box-like intake 52 of purified water communicates with the atmosphere by way of air tubes 55 and 56 also serving as poles for securing counterweights 57, 58.

The free passage area of the flexible pipes 46, 47, 48 and the extent to which their inlet ends 49, 50, 51 are continuously immersed relative to the dynamic level 37 of the sludge medium are preselected such that the lowering immersion depth of the blades 33 and 34 of the aerators 23 and 24 relative to the dynamic level 37 of the sludge medium would vary within a range of from $-0.05$ to $+0.15$ m.

The aeration tank for purifying waste water by activated sludge according to the invention operates in the following manner.

When the rate of supply of the waste water is rather low, the untreated water is conveyed along the distribution chute 4 through the inlets 3 to the mixing vessel 1 of the aeration tank where it is mixed with regenerated activated sludge fed through the inlet 5 from the sludge regenerator 18 (FIG. 1). The thus formed mixture having a concentration of activated sludge within 1.5 to 2.0 g/l is aerated by the dispersers 2 of the oxygen-containing gas connected by the air ducts 44 to the air blower 45 of the basic air-operated continuous-action aeration system of the first level. Therewith, the flow rate of the oxygen-containing gas is minimally sufficient for suspending the activated sludge and maintaining the aerobic activity thereof while the influx of the waste water to be treated is low. This prevents overconsumption of electric power at low process loads, provides favourable conditions for mass transfer of oxygen to the liquid since gas escapes to the liquid in the form of bubbles, and radically extends the service life of the dispersers, since gas loads exerted on unit area thereof are substantially minimized.

Subsequent to carrying out the process of biochemical oxidation of the impurities by microorganisms of the activated sludge taking place in the mixing vessel 1 of the aeration tank, the sludge mixture is conveyed through the outlet 6 by way of the launder 7 and weir 8 to the sludge separators 9, 10 communicated with the mixing vessel 1 and adapted for separating the purified water and recyclable sludge from the sludge medium. From the sludge separators 9, 10 and purified water flows along the overflow trough 11 to be evacuated by the regulator 38 of the dynamic level away from the aeration tank, whereas the separated sludge is fed by the airlifts 13, 14 to the sludge feeding trough 17, wherefrom the recyclable sludge is directed through the larger outlet passage 12 to the sludge regenerator 18, and through the smaller outlet passage 39 to the aerobic mineralizer 40 of excess activated sludge.

The excess activated sludge is treated in the aerobic mineralizer 40, this treatment process being terminated in the sludge compactor 42, whereafter the sludge having a moisture content of between 98 and 97%, that is a concentration of 20 to 30 g/l, depending on its initial properties, is conveyed for utilization, whereas the sludge water separated in the sludge compactor 42 is directed along the sludge water collecting chute 43 to the sludge regenerator 18.

The mutual positioning of the sludge separators 9, 10 of the aerobic mineralizer 40 and the sludge regenerator 18 makes it possible to save on the energy expendiable for feeding the activated sludge; the contact of the recyclable sludge with the oxygen of the air in the course of its transfer by the airlifts 13, 14 minimizes the negative effect of the anaerobic conditions to promote both accelerated recuperation of its activity and efficient compaction thereof.

Figure 3:
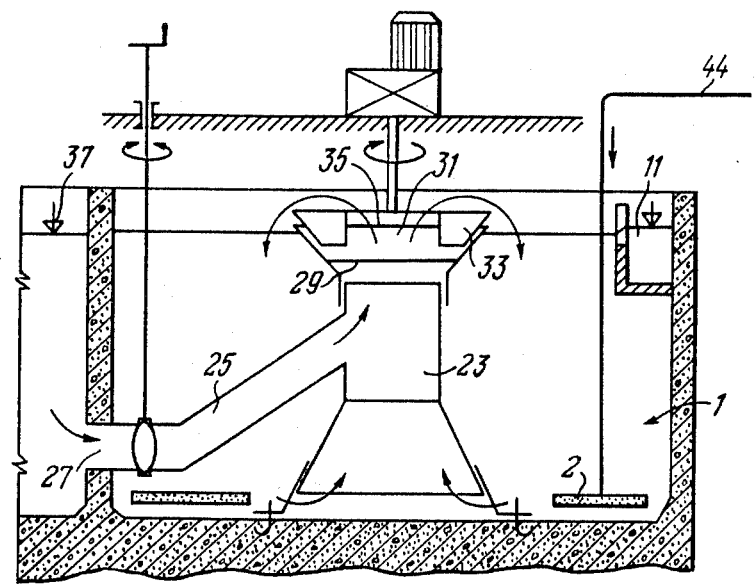
FIG. 3 is a view of the arrangement of a mechanically-operated vertical aerator.

An increase in the influx of waste water is followed by actuating the first mechanically-operated aerator 23 (FIG. 3) downflow of the aeration tank, whereby the activated sludge is supplied form the corresponding section 21 of the sludge regenerator 18 along the adjustable suction tube 25 having one end 27 thereof communicated with the regenerator 18 to the mixing vessel 1 of the aeration tank. This gives rise to a reverse circulation flow of the sludge mixture and the incoming sewage water from the mixing tank 1 to the regenerator 18 to promote oxygenation. An average concentration of the activated sludge of 2.5–3 g/l is therefore established in the "mixing vessel-first section of the regenerator" system, whereas an increase in the biochemical oxygen demand (BOD) is met through the operation of the mechanical aerator.

During a further increase in the influx of waste water supplied for treatment the second mechanically-operated aerator 24 is engaged, whereby activated sludge is conveyed from the corresponding section 22 of the regenerator 18 to the mixing vessel 1 of the aeration tank along the adjustable intake suction tube 26 having the end 28 thereof communicated with the regenerator 18. An average concentration of the activated sludge of within 4 to b 5 g/l is established in the "mixing vessel-two sections of the regenerator" system.

The oxygen-containing gas dispersers 2 are disposed about the periphery of the mixing vessel 1 in such a manner that during operation of the mechanical aerators 23, 24 the flows of fluid thrown thereby toward the periphery of the mixing vessel 1 promote a counterflow oxygenation by introducing oxygen-containing gas by the dispersers of the basic aeration system.

Therefore, introduction to the sludge medium of additional amounts of oxygen by a stepwise actuation of the mechanically-operated aerators 23, 24 assures a second aeration level, that is a controllable one or one that functions intermittently. If the basic pneumatic aeration system functions continuously, the operating schedule of the controllable aeration system will depend on the number of the mechanically-operated aerators; and when two such aerators are provided, the first will operate 8 to 10 hrs a day, while the second will operate during 4 to 6 hrs a day.

In order to prevent incidental overflow of the sludge medium from the mixing vessel 1 of the aeration tank to the sludge regenerator 18 when the influx of waste water is increased, the upper edges 35, 36 of the funnels 31,32 accommodating the blades 33, 34 of the mechanical aerators 23, 24 are disposed at least not below the dynamic level 37 of the sludge medium in the mixing vessel 1.

To provide for a more flexible control over the consumption of power during high influx of the waste water, as well as for a more efficient utilization of the mechanically-operated aerators 23, 24 the dynamic level of the sludge medium in the mixing vessel 1 communcable by the principle of communcating vessels with the sludge separators 9, 10 is adjusted in direct proportion to the influx of the waste water by the sludge medium dynamic level regulator 38 (FIG. 4). While passing between the guide partitions 53 the clarified water is conveyed to the box-like intake 52 of purified water, wherefrom it flows along the flexible pipes 46, 47, 48 to the overflow trough 11. Therewith, the flexible pipes 46, 47, 48 act not only to evacuate the treated water outside, but also function as soft restrictors to fix the position of the regulator 38 of the dynamic level of the sludge medium in plan. The provision of the flow guide partitions 53 in the box-like purified water intake 52 ensures a uniform withdrawal of water from the surface layers of the sludge separators 9, 10 (FIG. 2). When the influx of the waste water is low the water passes through the flexible pipes 46, 47, 48 (FIG. 4) capable of providing a predetermined flow rate with small head losses, which minimizes the immersion of the blades 33, 34 of the mechanically-operated aerators 23, 24 (FIG. 2). As the flow rate of the incoming waste water grows leading, in consequence, to an increase in the amount of organic solids, head losses in the liquid upon its passage through the flexible pipes become more pronounced, which causes a corresponding immersion of the mechanically-operated aerators 23, 24 operating in unison to result in a more vigorous oxygenation.

When the influx of waste water is above the rated one, the level of liquid raises above the edge of the overflow trough 11, and part of the clarified waste water, apart from passing through the flexible pipes 46, 47, 48 (FIG. 3), is caused to overflow to the trough 11, while the degree of immersion of the mechanically-operated aerators 23, 24 is not in excess of the extreme allowable one.

Such a construction of the regulator 38 of the dynamic level of the sludge medium enables to gradually vary the level of the sludge medium in the sludge separators 9, 10 (FIGS. 1 and 2) and in the mixing vessel 1 communicating therewith, which in turn results in a gradual variation in the depth of immersion of the blades 33, 34 of the mechanically-operated aerators 23, 24 so that a higher influx of waste water will cause the mechanically-operated aerators 23, 24 to introduce a greater amount of oxygen to thereby save on the amount of electric power consumed.

Depending on the depth of immersion of the blades of the mechanically-operated vertical aerator, three operating conditions (FIG. 5) are possible: splashing, vigorous aeration, and mixing.

Splashing takes place normally at a relatively small depth h (0.1 to 0.05 m) of immersion of the blades. Under these conditions the oxidation power (OP) and energy consumption are quite low.

As the depth h of immersion of the blades increases from 0.05 to 0.15 m (at invariable rotational speed), the oxidation power (OP) of the mechanically-operated vertical aerator reaches its peak value, whereas the power N grows linearly in the range of immersion depths providing for vigorous aeration.

At a still greater depth h (more than 0.15 m) of immersion of the blades the oxidation power of the aerator drops sharply, because the blades progressively lose contact with air to result in mixing conditions which require the highest values N of the power consumed.

As can be seen from FIG. 5, there is an optimum range for immersion of the blades in which the efficiency of aeration and oxygenation are most favourable. Such optimized operation is attained by that the free passage area of the flexible pipes for the dynamic level regulator and the level of continuous immersion of the ends of these flexible pipes relative to the dynamic level of the sludge medium is selected such that the immersion depth of the blades of the aerator relative to the dynamic level of the sludge medium would vary within from 0.05 to 0.15 m.

In view of the foregoing, the apparatus according to the invention ensures a complete and stabilized biological purification of waste water under considerable fluctuations of the waste water influx and at varying concentrations of organic contaminants in the waste water. The proposed invention makes it possible to substantially simplify the aeration tank structurally, improve its reliability, reduce the working volume thereof, and save on the electric power consumed for aeration while maintaining a high degree of purification of waste water.

What is claimed is:

1. An aeration tank for purifying waste water by activated sludge comprising:

a mixing vessel having inlets of waste water and regenerated activated sludge, and an outlet of sludge medium;

dispersers of oxygen-containing gas disposed inside said mixing vessel;

a sludge separator communicable, with said outlet of sludge medium of said mixing vessel and adapted to separate recyclable sludge and purified water from the sludge medium, said sludge separator having an outlet of purified water and an outlet of recyclable sludge;

a regulator of the dynamic level of the sludge medium disposed at said outlet of purified water of said sludge separator and adapted to adjust the dynamic level of the sludge medium in direct dependence on the influx of waste water;

a regenerator of activated sludge communicating with said outlet of recyclable sludge of said sludge separator and having an outlet connected to said inlet of said mixing vessel for feeding regenerated activated sludge thereto;

dispersers of oxygen-containing gas disposed in said regenerator;

at least one vertically arranged mechanically-operated blade-type aerator disposed in said mixing vessel;

a suction tube of said aerator having an inlet end communicating with said regenerator, and an outlet end;

a funnel of said tube arranged on its outlet end so that the upper edge of said funnel overlies the dynamic level of the sludge medium in said mixing vessel;

blades of said aerator disposed in said funnel portion of the tube; and at least one source of oxygen-containing gas connected to said dispersers of oxygen-containing gas.

2. An aeration tank as defined in claim 1, in which said regulator of the dynamic level of the sludge medium is fashioned as an overflow trough communicating by at least two flexible pipes secured to its ends and having their own inlet ends connected to a box-like intake of purified water provided with flow guide partitions and a floating element to ensure a continuous depth of immersion of said inlet ends of said flexible pipes relative to the dynamic level of the sludge medium.

3. An aeration tank according to claim 2, in which the free passage area of the flexible pipes and the depth of continuous immersion of their inlet ends relative to the dynamic level of the sludge medium is selected such that the depth of immersion of said blades of the aerator relative to the dynamic level of the sludge medium varies within from 0.05 to 0.15 m.

* * * * *